Nov. 21, 1944. C. G. HICKS Re. 22,567

MECHANISM FOR CUTTING AND LOOPING SPRINGS

Original Filed July 25, 1941 2 Sheets-Sheet 1

Carl G. Hicks
INVENTOR.

BY Clarence E. Thredy
HIS ATTORNEY

Nov. 21, 1944. C. G. HICKS Re. 22,567
MECHANISM FOR CUTTING AND LOOPING SPRINGS
Original Filed July 25, 1941 2 Sheets-Sheet 2
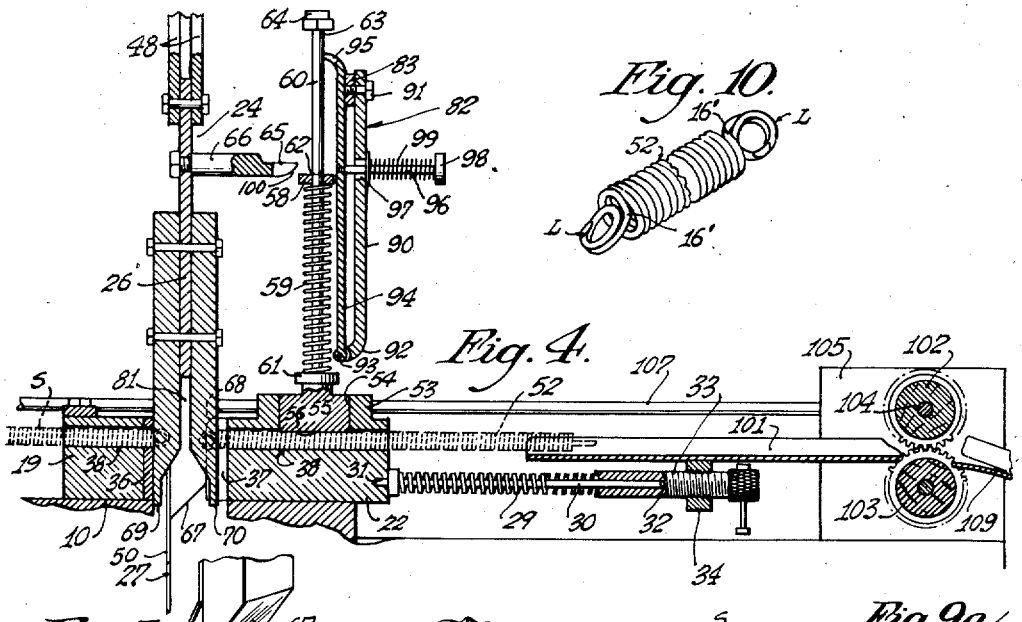
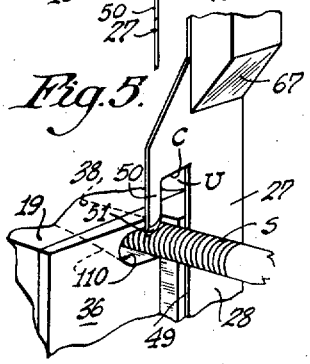
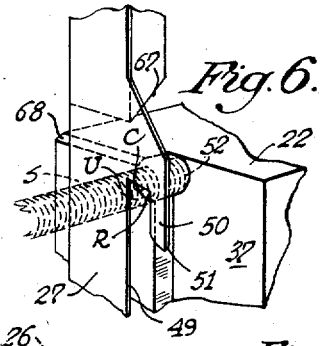
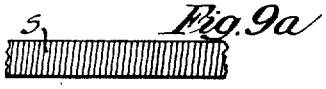
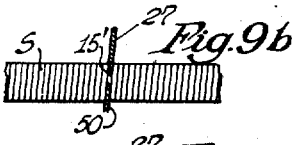
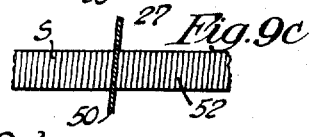
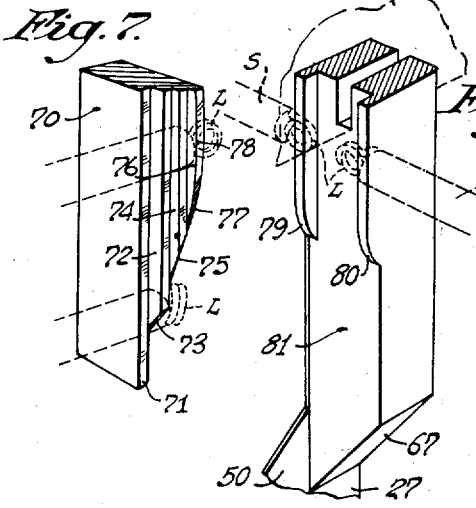
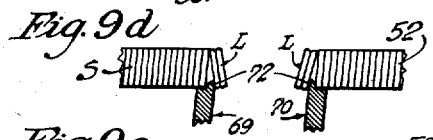
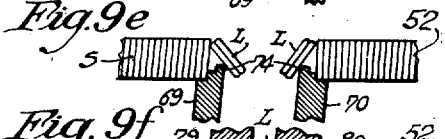
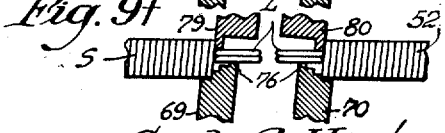
Carl G. Hicks
INVENTOR.
BY Clarence E. Threedy
HIS ATTORNEY.

Reissued Nov. 21, 1944

Re. 22,567

UNITED STATES PATENT OFFICE 22,567

MECHANISM FOR CUTTING AND LOOPING SPRINGS

Carl G. Hicks, Chicago, Ill., assignor to Maurice T. Williams and Ralph E. Williams Original No. 2,268,824, dated January 6, 1942, Serial No. 403,934, July 25, 1941. Application for reissue October 26, 1942, Serial No. 463,389

25 Claims. (Cl. 140—103)

This invention relates to mechanism for cutting and looping spring elements and has for its principal object the provision of a simple mechanism which is economical in manufacture and highly efficient in use.

It is another object of this invention to provide an automatic machine which will operate to coil straight wire into a spring unit, abate such operation while the coil spring is cut into lengths, and resume said operation and simultaneously therewith convey the severed length away from the machine.

Another object of my invention is the provision of a device having cutting and forming dies and a controlled cutting and forming unit adapted to move into operative relation with respect to the dies for the purpose of severing a spring unit disposed in the dies and to form loops at the severed ends of such spring units.

Still another object of this invention is the provision of a device for separating the severed ends of the spring unit after the cutting operation to permit the convolution of the spring adjacent the severed ends to be bent out to provide loop formations at the end of the spring unit.

A further object of the present invention is to provide a novel means for clamping the severed portion of the spring unit in the movable die member during the cutting and forming operation, so that the severed spring unit will be held during the cutting operation and thereafter will be movable with the movable die member for the forming operation.

It is a further object of the present invention to provide a means for releasably holding the clamping means for the severed spring unit out of clamping position until the spring unit to be acted upon is fed into the desired position with respect to the cutting and forming unit and the latter operated for the purpose of severing the spring unit.

A still further object of the present invention is the provision of novel means for automatically recoupling the releasable holding means for the spring clamping device with the latter when the cutting and forming unit is withdrawn from operative position back toward normal condition.

The present invention relates to a mechanism for the cutting and looping of spring elements while the process per se is described and claimed in my copending application Serial No. 463,377 entitled "Method of cutting and looping springs," filed October 26, 1942.

Other objects, advantages and novel aspects of my invention will appear more fully as the device is described in conjunction with the drawings, in which:

Fig. 4 is a vertical sectional detail view substantially like Fig. 3 but slightly reduced in scale with respect thereto, and illustrating the parts thereof in cutting and forming position;

Fig. 5 is a fragmentary perspective view illustrating the first step in the cutting operation;

Fig. 6 is a fragmentary perspective view, complementary to Fig. 5, illustrating the shearing operation;

Fig. 7 is a perspective view of one of the forming dies illustrating the gradual steps in the loop forming operation;

Fig. 8 is a perspective view of a crimping die adapted to cooperate with the forming die of Fig. 7;

Figures 1, 2, 3:
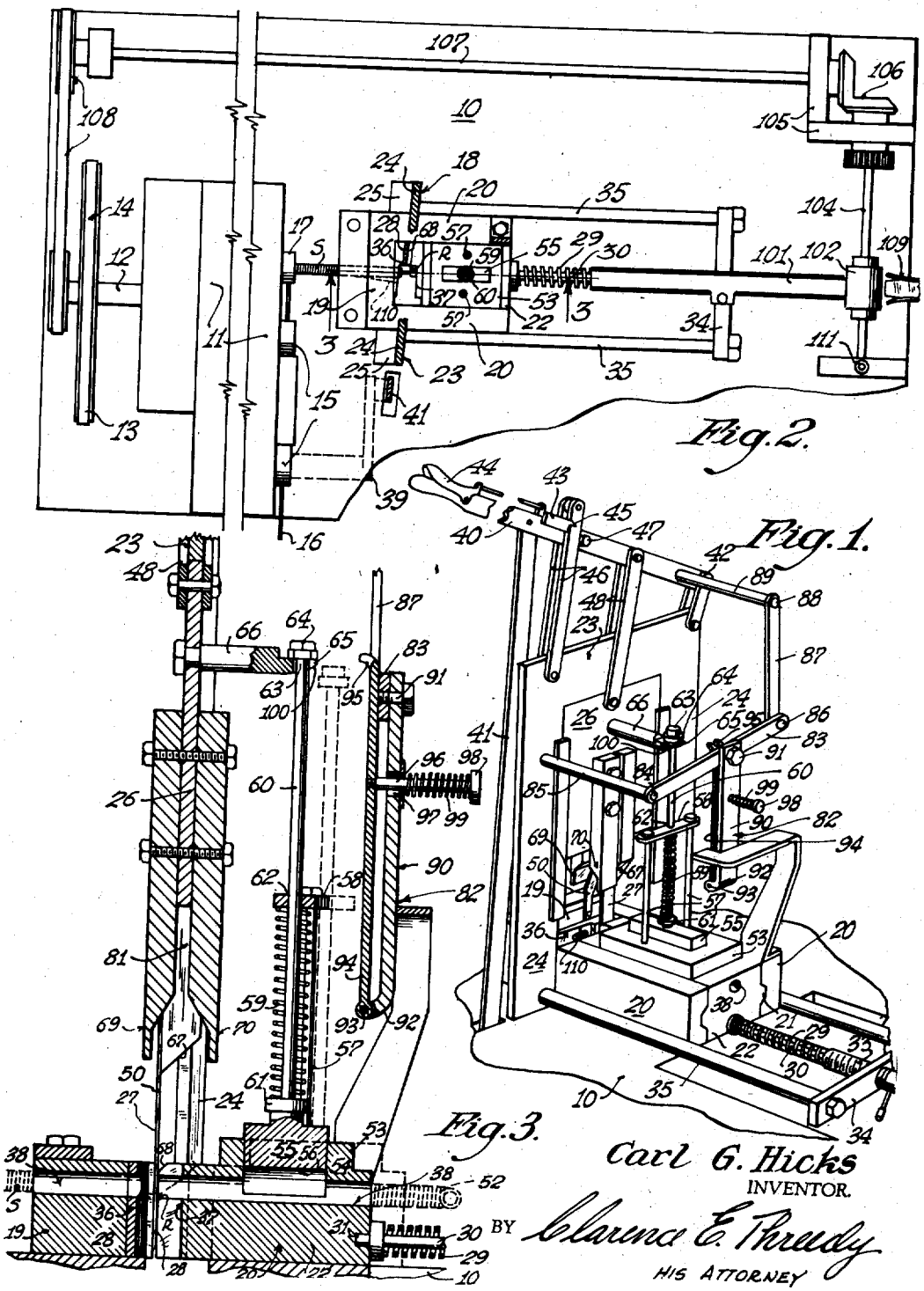
Fig. 1 is a fragmentary perspective view of the cutting and forming unit showing the several parts therein illustrated in normal position.
Fig. 2 is a plan view of the machine embodying my invention.
Fig. 3 is a vertical sectional detail view through the cutting and forming unit and is taken substantially along line 3—3 in Fig. 2.

Figs. 9*a*, 9*b*, 9*c*, 9*d*, 9*e* and 9*f* are illustrative of the principal steps in the cutting and forming operation, showing a spring unit in the various stages from start to finish; and Fig. 10 is a foreshortened perspective view of a finished spring showing the two ends thereof looped for use.

The general arrangement is best disclosed in Fig. 2 of the drawings, wherein 10 indicates a bed plate or table which forms the substructure of the entire machine. Mounted on the bed plate 10 is a wire coiling unit 11 having conventional gearing (not shown) adapted to be driven through shaft 12 in turn drivingly connected with a pulley 13 having a belt drive 14 operatively trained over a like pulley associated with any suitable drive shaft or source of motion.

The wire coiling unit 11 has the usual feed rollers 15 into which straight wire 16 is fed and by which such wire is forced into a coiling die 17 whence there is emitted a finished spring S in a direction at right angles to the line of feed of the wire 16.

A cutting and forming unit generally indicated at 18 is mounted on the table 10 adjacent the wire coiling unit 11. This unit 18 comprises in the main a stationary block 19 from which extends a pair of rails 20 grooved as at 21 to provide a guide for a movable block 22. A stationary frame 23 having a pair of vertically disposed leg elements 24 fixed to the table 10 as at 25 straddles the rails 20 at the line of juncture of the two blocks 19 and 22. Between the legs 24 there is arranged for slidable movement a carriage 26 which carriage 26 has disposed thereon, among other things, a guide element 27 the lower end 28 of which is normally disposed between the abutting ends of the block elements 19 and 22.

The block 19 is disposed nearest the coiling unit 11 and forms an abutment for the movable block 22 which is normally urged toward block 19 by a helical spring means 29. The spring 29 is arranged on a rod 30 one end of which is reduced to seat into a recess formation 31 in block 22, the opposite end of which rod 30 is disposed for sliding movement in a sleeve 32 formed in an adjustable screw anchor 33. The anchor 33 is threadably supported in a cross beam 34 carried at its ends on a pair of parallelly arranged strut bars 35 extending horizontally from the leg elements 24 adjacent the rails 20. The arrangement is such that the compression force of the helical spring 29 may be varied by adjusting the screw anchor 33 to position the anchor 33 nearer to the block 22, thus increasing the force against the block 22 or to withdraw the screw anchor 33 to relieve the spring pressure on the block 22.

The abutting faces of the two blocks 19 and 22, heretofore referred to, are provided with tooled die units 36 and 37 respectively for reasons hereinafter to be explained. Each of the blocks 19 and 22 has formed therein a guideway 38 for the passage of the coil spring S produced on the wire coiling unit 11, and these guideways 38 are in axial alignment with the spring S as it emerges from the coiling die 17 such that the normal operation of the coiling unit will automatically feed the finished spring S into and through the guideways 38 until the desired length of spring has passed beyond the die units 36—37. The coiling unit 11 will be shut off to stop the feeding of the spring S, by and through the medium of a shut-off lever 39 operatively connected with the unit 11 and linked for operation to the main control lever 40 by a rod 41, such that when the lever 40, which is normally latched in raised position, is released for downward rotative movement about its pivotal connection at 42 on the frame 23, the rod 41 will be depressed to operate the normally open shut-off lever 39 to stop the operation of the wire coiling unit until the lever 40 again resumes normal position.

The main control lever 40 is latched in raised position by a latch 43 slidably arranged on lever 40 and normally urged by a spring-operated palm grip 44 toward and into a notch 45 formed on a pair of arms 46 pivotally supported on the frame 23 and lying against rollers 47 on lever 40 to hold the arms 46 in position to receive the latch 43. A link 48 connects the main control lever 40 to the vertically movable carriage 26 such that upon release of the latch 43 from notch 45 the depression of lever 40 will likewise depress the carriage 26. The movable block 22 has its center portion 53 raised slightly above the uppermost surface of the rails 20, and in this raised portion 53 there is cut a slot 54 clear through to the guideway 38 in block 22. There is disposed in the slot 54 for vertical movement relative thereto a clamping jaw 55, the lower end 56 of which is formed to bear down against the coil spring S passing through the guideway 38 to hold the spring S in vise-like fashion in the shifting block 22 for reasons hereinafter to become apparent. A pair of vertically disposed studs 57 have support on and extend upwardly from the block 53 and bridging the upper ends of these studs 57 is a plate 58 having its central portion directly above the movable jaw 55. A compression spring 59 is arranged between the jaw 55 and the plate 58 upon a rod 60 which is fixed to and extends upwardly from the jaw 55 and has its lower end flared out as at 61 to provide a seat for the lower end of the spring 59; the upper end of the rod 60 extending through a passage 62 formed in the plate 58 to support the spring and rod in vertical position and to guide the movement of its headed end 63 which carries a pair of locked nuts 64 whereby the headed end 63 is normally but releasably latched in a yoke formation 65 formed in the end of a stud 66 extending vertically from the carriage 26 for movement therewith.

By the foregoing arrangement of parts there is provided a means for clamping spring elements S within the movable block 22. The clamping jaw 55 is normally out of clamping relationship with spring elements disposed within block 22 but having an immediate clamping action upon such spring elements when the lever 40 is depressed as aforesaid and the carriage 26 descends to thereby release the yoke 65 from its hold on the spring-urged rod 60 and the clamping jaw connected thereto.

From the disclosure of Fig. 2, it is made apparent that the frame 23 is disposed at an angle to the axis of the coil spring S, which angle places the frame and its associated parts in a plane parallel to the pitch on the coils of the spring S. As hereinbefore stated, the carriage 26 has arranged thereon a guide element 27 the lower end 28 of which is disposed between the abutting ends of the blocks 19 and 22. Referring to Fig. 5, it will be noted that the guide element 27 is adapted to move up and down with one (left-hand) edge 49 thereof immediately adjacent the spring S as it passes through the guideways 38 and that there extends from such edge 49 a laterally extending and projecting finger 50, the lower end 51 of which is ground to a keen edge. This edge 51 is so disposed as to provide an inverted U-shaped trough U adapted to ride upon the spring S and to provide a shearing edge C at the bight of the trough U. The edge 51 is arranged such that upon descent of the carriage 23 the edge 51 will act as a wedge to spread the convolutions of the spring S, thus clearing the way for the shearing or cutting edge C which coacts with the lower rim R of the guideway 38 on the die 37 on the movable block 22 (Fig. 6) to effect a shearing action on the wire element 16', thus severing the same at such shearing point and leaving a free spring unit 52 to the right of the frame 23 within the movable block 22, any shavings or fillings by reason of the cutting operation falling straight down through an opening in the bed plate 10; it being noted that during this shearing operation such free end of the coil spring S is held by the clamping jaw 55 within the block 22.

Immediately above the plane of the cutting edge C in vertical alignment with the guide element 27 is a cam formation 67 which is movable with the guide 27 and carriage 26 for engagement with a beveled edge 68 on the die 37 carried by the movable block 22. As seen in Fig. 3, the downward movement of this cam 67 will urge the block 22 and all parts carried thereby to the right including the spring unit 52 now severed from the main unit S, thereby spreading the several ends of these now individual units preparatory to the forming operation now to be explained.

Each of the die units 36—37 carried by the blocks 19 and 22 respectively are set back from the line of abutting relation with the guide element 27, just adjacent the edge 49 thereof so as to provide a path of movement for a pair of forming dies 69 and 70. Each of these forming dies 69 and 70 is fixed upon the vertically movable carriage 26 for movement therewith and are so disposed as to move in the path provided between the setbacks provided in the dies 36—37. These dies 69 and 70 are alike in structure inasmuch as each of them is provided with a series of forming cams facing in the direction of the severed ends of the spring units S and 52. In this regard, reference is made to Fig. 7 wherein die 70 is shown as having a leading edge 71 adapted to bear against the side wall of the spring 52 to keep the latter in abutting relation with the inner side wall of the guideway 38. A forming edge 72 extends slightly beyond the edge 71 and has its lowermost edge 73 wedge-shaped so as to pivot the two outside convolutions L in a direction away from the main body (S or 52) of the spring members acted upon (see Fig. 9*d*). A second forming edge 74, having its lower edge 75 on an acute angle, is adapted to further swing the already pivoted end convolution L into the position shown in Fig. 9*e*.

The final forming operation by the die 69 or 70 is adapted to be performed concurrently with a crimping or bending operation by cam elements 79—80 which are associated with the dies 69—70 respectively. This final operation will best be understood in the light of Figs. 7 and 8 taken together, wherein the die 70 is substantially in its plane of horizontal alignment with the cam 80 (and 79), which cam is formed on that side 81 of the cam block 67 facing the sheared ends of the several springs S and 52.

The die 70 (also 69) has a forming edge 76, in addition to those already mentioned, which forming edge 76 has an arcuated lower edge 77 with a sweeping rise to an extreme extending edge 78 thereof. The arrangement is such that the crimping cam 80 engages the loop L at its point of connection with the main body of the spring 52 and simultaneously therewith the forming edge 76 of the forming die 70 engages the extending loop L approximately at its mid portion (Fig. 9*f*). As the extreme edges 78 and 80 of the two coacting cams come into engagement with the loop L, a positive bend or crimp will be effected in the wire element 16′ at the point of connection between the loop L and the spring 52.

It will be apparent that the foregoing description of structure and operation pertaining to the forming die 70 and the crimping cam 80 is equally applicable to the forming die 69 and crimping cam 79 (Figs. 9*d*, 9*e*, and 9*f*) and that in the forming and crimping operation the sheared ends of each of the spring units S and 52 are looped as explained. By reason of this simultaneous looping operation, the leading end of the spring unit S is prepared first and the trailing end of such unit S, after it has been severed into an individual spring unit 52, is subsequently formed to provide a like loop, thus leaving a completed spring 52 (as shown in Fig. 10) clamped within the block 22.

The cutting and forming operations having been completed by reason of a full depression of the main control lever 40, the latter is then swung upwardly to raise the carriage 26 and its associated parts. It will be noted that by reason of the block 22 having shifted to the right, as seen in Fig. 4, the spring and rod assembly 59—60 of the clamping jaw 55 is out of vertical alignment with the latching yoke 65 and that the stud 66 and yoke 65 will ascend with the carriage 26 beyond the horizontal plane of the headed end 63 on the rod 60 before there is a positive coupling. For this reason there is provided a novel coupling means which will operate automatically during the return movement of the main control lever 40.

The coupling means, best illustrated in Fig. 1, is generally indicated at 82 and comprises a swinging support in the form of a lever 83 pivotally arranged as at 84 on the laterally extending stud 85 in turn carried by the frame 23 to provide a fixed pivot. The opposite end of the lever 83 is pivotally connected as at 86 to the lower end of a link 87, the upper end of which link has pivotal connection as at 88 to one end of a stud 89 which is attached to and carried by the lever 40 at a point spaced from its fulcrum 42 so that the stud 89 will be movable with the lever 40 to impart a swinging motion to the swinging support or lever 83. The main coupling tool is arranged on the swinging support 83 midway of its ends by suspending a vertically disposed base plate 90 from the lever 83, the plate 90 having a loose pin connection 91 with such lever 83. The lower end 92 of plate 90 is provided with a trunnion wherein there is arranged on a horizontal axis 93 an upwardly extending coupling finger 94 having a forked upper end 95 bent outwardly in a direction away from the plate 90. This finger 94 is normally held in parallelism with respect to the plate 90 by providing the finger 94 with a headed pin 96 carried by the finger 94 and extending through an opening or slot 97 formed in the plate 90, there being a headed portion 98 on this pin 96 and a spring 99 arranged between the head 98 and the plate 90.

When the carriage 26 is lowered as hereinbefore explained, the coupling means is likewise lowered a proportionate amount and assumes a position relative to the rod 60 of the spring clamping means as is shown in Fig. 4. As the lever 40 is raised to return the same to normal position as seen in Fig. 1, the forked finger 95—94 will be raised simultaneously therewith so that the fork 95 will engage beneath the nut elements 64 on the headed end 63 of the rod 60, it being clearly shown that such engagement will take place before the cam 67 releases the block 22 for return movement. Upon subsequent ascension of the carriage 26 the cam 67 will gradually release the base for movement toward the left by its spring 29, such continued ascension at the same time causing the finger 94 to impart a lifting action on the headed rod 60, thereby raising the jaw 55 out of engagement with the spring unit 52 to release the latter for continued movement through the guideway 38.

As the block 22 moves to the left, the finger 94 is free to swing in a counterclockwise direction about the axis 93 and by reason thereof the finger 94 will continue to raise the headed end 63 of the rod 60 concurrently with the ascension of the yoke 65. The lower end of the yoke formation 65 is provided with a cam surface 100 against which the yoke fingers 95 will bear so that as the lever 40, carriage 26, and coupling unit reach their extreme uppermost position the yoke 95 will be cammed back toward the plate 90.

When the fork 95 has been sufficiently cammed away from the yoke 65, the latter will become positioned under the head nuts 64 and when the tension or frictional bearing between the fork 95 and the head nuts 64 is relieved the spring 99 will snap the finger 94 back to vertical condition.

It will be noted that upon the return movement of the carriage 26, the laterally extending finger 50 will again engage the spring S. In order not to distort the completed or looped end L of the remaining spring unit S, there is formed in the stationary block 19 a flared opening 110 (Fig. 5) and the finger 50 is provided with an obliquely disposed top surface. When the carriage 26 is raised as aforesaid, the surface of the projection 50 will bear against the finished end of the spring S and the latter will be flexed into the flared portion 110 of the guideway 38, thereby permitting a by-pass for the finger 50. When the finger 50 has resumed its normally raised position, the spring S will by its own resiliency return into axial alignment with the main body thereof. The lever 40 will by that time have reached its fully raised position where it will again be latched by bolt 43 and notch 45, and by the same token the rod 41 will have been lifted to raise the shut-off lever 39 on the wire coiling unit 11, whereupon the wire 16 will again be drawn through the feeding rollers 15 and another section of coil spring S emitted from the coiling die 17. Such additional length of spring S will be fed into the guideways 38 in the blocks 19 and 22 as hereinbefore explained, the completed unit 52 having previously been drawn to the right, beyond the block 27 into a conveyor tray 101 positioned on the cross beam 34. The tray 101 is adapted to receive and guide completed springs toward a pair of extracting rollers 102 and 103, the uppermost one 102 of which is drivingly connected to a shaft 104 journaled in bearing blocks 105. The shaft 104 is connected by bevel gears 106 to a drive shaft 107 having power connection through belt and pulley 108 with the main drive shaft 12. Spring units 52 extracted through the rollers 102—103 are fed into an inclined chute 109 for conveyance into a suitable receptacle (not shown). The rollers 102—103 are provided with a tensioner adjustment 111 (Fig. 1) for setting the pulling action of the rollers. By this arrangement completed springs have their free end extended into the rollers 102—103 which slippingly ride over such free end until clamping jaw 55 is released, whereupon the rollers 102—103 effect a withdrawal of the spring 52.

While I have illustrated and described the preferred form of construction for carrying my invention into effect, this is capable of variation and modification without departing from the spirit of the invention. I therefore do not wish to be limited to the precise details of construction set forth, but desire to avail myself to such variations and modifications as come within the scope of the appended claims.

I claim as my invention:

1. In a device of the class described, a fixed bed and a movable bed, means normally urging the movable bed toward the fixed bed, said two bed means providing a path of movement for a spring unit to be acted upon, a movable carriage arranged above said two beds and having a shear portion thereof disposed between said beds for shearing said spring unit into separate body portions, cam means on said carriage for moving said movable bed away from said fixed bed for separating the severed ends of said sheared spring, means on said carriage flexing the two last convolutions of said severed ends in a direction away from the body portion of the respective spring, a complementary means for crimping said last two convolutions at right angle to the body of the spring, and means for moving said carriage with respect to the two bed means for the purpose aforesaid.

2. In a device of the class described a fixed bed and a movable bed, means normally urging the movable bed toward the fixed bed, said two bed means providing a path of movement for a spring unit to be acted upon, a movable carriage arranged above said two beds and having a shear portion thereof disposed between said beds for shearing said spring unit into separate body portions, cam means on said carriage for moving said movable bed away from said fixed bed for separating the severed ends of said sheared spring, means on said movable bed for clampingly engaging said spring unit when the movable bed is shifted as aforesaid, means on said carriage flexing the two last convolutions of said severed ends in a direction away from the body portion of the respective spring, a complementary means for crimping said last two convolutions at right angle to the body of the spring, and means for moving said carriage with respect to the two bed means for the purpose aforesaid.

3. In a device of the class described, a fixed bed and a movable bed, means normally urging the movable bed toward the fixed bed, said two bed means providing a path of movement for a spring unit to be acted upon, means for feeding a spring unit along said path of movement, a movable carriage arranged above said two beds and having a shear portion thereof disposed between said beds for shearing said spring unit into separate body portions, cam means on said carriage for moving said movable bed away from said fixed bed for separating the severed ends of said sheared spring, means on said carriage flexing the two last convolutions of said severed ends in a direction away from the body portion of the respective spring, a complementary means for crimping said last two convolutions at right angle to the body of the spring, and means for moving said carriage with respect to the two bed means for the purpose aforesaid and for automatically stopping said means for feeding the spring unit along said aforementioned path of movement during the shearing and forming operation.

4. In a device of the class described, a fixed bed and a movable bed, means normally urging the movable bed toward the fixed bed, said two bed means providing a path of movement for a spring unit to be acted upon, means for feeding a spring unit along said path of movement, a movable carriage arranged above said two beds and having a shear portion thereof disposed between said beds for shearing said spring unit into separate body portions, cam means on said carriage for moving said movable bed away from said fixed bed for separating the severed ends of said sheared spring, means on said carriage flexing the two last convolutions of said severed ends in a direction away from the body portion of the respective spring, a complementary means for crimping said last two convolutions at right angle to the body of the spring, means for moving said carriage with respect to the two bed means for the purpose aforesaid and for automatically stopping said means for feeding the spring unit along said aforementioned path of movement during the shearing and forming operation, and automatic means for drawing the severed portion of said spring unit away from said movable bed when the latter is permitted to return to normal position.

5. In a device for cutting and forming looped ends on springs, a stationary die, a movable die, means normally urging the latter toward the former, said dies providing a path of movement for a spring to be acted upon, means for cutting said spring into two pieces and for forming a loop at the severed ends of the respective pieces, said means comprising a carriage arranged for vertical movement, a shear on said carriage and having a portion thereof disposed between said dies and including a cam means for effecting movement of said movable die, a flexing cam on said carriage and adapted to flex the last two convoluted loops of the aforementioned severed ends of the spring at right angles to the direction of twist of the spring, and a complementary bending cam element adapted to engage said two convoluted loops in the region of their point of connection with the main body of the spring to crimp said point of connection thereby to maintain said loops at right angles to the spring as aforesaid, and means for effecting movement of the carriage for the purpose aforesaid.

6. In a device of the class described including a fixed guideway and a movable guideway normally urged toward the former, means for feeding a spring unit along said fixed and movable guideways, together with cutting and forming means arranged for vertical movement between said fixed and movable guideways and adapted to descend for the purpose of severing said spring unit into desired lengths and to form loops on the severed ends of said spring, the combination of means on said movable guideway for gripping said length of spring unit to hold the latter during the forming operation aforesaid, said means including a guide formation in said movable guideway, a movable jaw arranged to reciprocate in said guide formation toward and away from the spring unit in said movable guideway, and means connecting said movable jaw with said cutting and forming means for movement therewith.

7. In a device of the class described including a fixed guideway and a movable guideway normally urged toward the former, means for feeding a spring unit along said fixed and movable guideways, together with cutting and forming means arranged for vertical movement between said fixed and movable guideways and adapted to descend for the purpose of severing said spring unit into desired lengths and to form loops on the severed ends of said spring, the combination of means on said movable guideway for gripping said length of spring unit to hold the latter during the forming operation aforesaid, said means including a guide formation in said movable guideway, a movable jaw arranged to reciprocate in said guide formation toward and away from the spring unit in said movable guideway, means normally urging said movable jaw toward said spring unit to clamp the latter in vise-like action in said guideway, means on said cutting and forming means for releasably holding said movable jaw out of said normal position and adapted to release the movable jaw when the cutting and forming means is operated as aforesaid, and means for recoupling said movable jaw with said cutting and forming means when the latter ascends toward normal position.

8. In a device of the class described including a fixed guideway and a movable guideway normally urged toward the former, means for feeding a spring unit along said fixed and movable guideways, together with cutting and forming means arranged for vertical movement between said fixed and movable guideways and adapted to descend for the purpose of severing said spring unit into desired lengths and to form loops on the severed ends of said spring lengths, the combination of means on said movable guideway for gripping said length of spring unit to hold the latter during the cutting and forming operation aforesaid, said means including a guide formation on said movable guideway, a movable jaw arranged to reciprocate in said guide formation toward and away from the spring unit, means on said cutting and forming means for releasably holding said movable jaw in raised position and for releasing said movable jaw when the cutting and forming means is operated as aforesaid.

9. In a device of the class described including a fixed guideway and a movable guideway normally urged toward the former, means for feeding a spring unit along said fixed and movable guideways, together with cutting and forming means arranged for vertical movement between said fixed and movable guideways and adapted to descend for the purpose of severing said spring unit into desired lengths and to form loops on the severed ends of said spring lengths, the combination of means on said movable guideway for gripping said length of spring unit to hold the latter during the cutting and forming operation aforesaid, said means including a guide formation on said movable guideway, a movable jaw arranged to reciprocate in said guide formation toward and away from the spring unit, means on said cutting and forming means for releasably holding said movable jaw in raised position and for releasing said movable jaw when the cutting and forming means is operated as aforesaid, and coupling means operatively connected to said cutting and forming means and adapted to couple said movable jaw with said cutting and forming means when the latter is returned to a normal position.

10. In a device of the class described including a fixed guideway and a movable guideway normally urged toward the former, means for feeding a spring unit along said fixed and movable guideways, together with cutting and forming means arranged for vertical movement between said fixed and movable guideways and adapted to descend for the purpose of severing said spring unit into desired lengths and to form loops on the severed ends of said spring lengths, the combination of means on said movable guideway for gripping said length of spring unit to hold the latter during the cutting and forming operation aforesaid, said means including a guide formation on said movable guideway, clamping means arranged to reciprocate in said guide formation toward and away from the spring unit, means on said cutting and forming means for releasably holding said clamping means in raised position and for releasing said clamping means when the cutting and forming means is operated as aforesaid.

11. In a device of the class described including a fixed guideway and a movable guideway normally urged toward the former, means for feeding a spring unit along said fixed and movable guideways, together with cutting and forming means arranged for vertical movement between said fixed and movable guideways and adapted to descend for the purpose of severing said spring unit into desired lengths and to form loops on the severed ends of said spring lengths, the combination of means on said movable guideway for gripping said length of spring unit to hold the latter during the cutting and forming operation aforesaid, said means including a guide formation on said movable guideway, clamping means arranged to reciprocate in said guide formation toward and away from the spring unit, means on said cutting and forming means for releasably holding said clamping means in raised position and for releasing said clamping means when the cutting and forming means is operated as aforesaid, and coupling means operatively connected to said cutting and forming means and adapted to couple said clamping means with said cutting and forming means when the latter is returned to a normal position.

12. In a device of the class described including a fixed guideway and a movable guideway normally urged toward the former, means for feeding a spring unit along said fixed and movable guideways, together with cutting and forming means arranged for vertical movement between said fixed and movable guideways and adapted to descend for the purpose of severing said spring unit into desired lengths and to form loops on the severed ends of said spring lengths, the combination of means on said movable guideway for gripping said length of spring unit to hold the latter during the cutting and forming operation aforesaid, said means including a guide formation on said movable guideway, a movable jaw arranged to reciprocate in said guide formation toward and away from the spring unit, means on said cutting and forming means for releasably holding said movable jaw in raised position and for releasing said movable jaw when the cutting and forming means is operated as aforesaid, and coupling means operatively connected to said cutting and forming means and adapted to couple said gripping means with said cutting and forming means when the latter is returned to a normal position.

13. In a device of the class described including a fixed guideway and a movable guideway normally urged toward the former, means for feeding a spring unit along said fixed and movable guideways, together with cutting and forming means arranged for vertical movement between said fixed and movable guideways and adapted to descend for the purpose of severing said spring unit into desired lengths and to form loops on the severed ends of said spring lengths, the combination of means on said movable guideway for gripping said length of spring unit to hold the latter during the cutting and forming operation aforesaid, said means including a guide formation on said movable guideway, a movable jaw arranged to reciprocate in said guide formation toward and away from the spring unit, means on said cutting and forming means for releasably holding said movable jaw in raised position and for releasing said movable jaw when the cutting and forming means is operated as aforesaid, coupling means operatively connected to said cutting and forming means and adapted to couple said movable jaw with said cutting and forming means when the latter is returned to a normal position, and means frictionally engaging said severed spring unit for withdrawing the same from said movable guideway.

14. In a device of the class described including a fixed guideway and a movable guideway normally urged toward the former, means for feeding a spring unit along said fixed and movable guideways, together with cutting and forming means arranged for vertical movement between said fixed and movable guideways and adapted to descend for the purpose of severing said spring unit into desired lengths and to form loops on the severed ends of said spring lengths, the combination of means on said movable guideway for gripping said length of spring unit to hold the latter during the cutting and forming operation aforesaid, said means including a guide formation on said movable guideway, clamping means arranged to reciprocate in said guide formation toward and away from the spring unit, means on said cutting and forming means for releasably holding said clamping means in raised position and for releasing said clamping means when the cutting and forming means is operated as aforesaid, and means frictionally engaging said severed spring unit for withdrawing the same from said movable guideway.

15. In a device of the class described including a fixed guideway and a movable guideway normally urged toward the former, means for feeding a spring unit along said fixed and movable guideways, together with cutting and forming means arranged for vertical movement between said fixed and movable guideways and adapted to descend for the purpose of severing said spring unit into desired lengths and to form loops on the severed ends of said spring lengths, the combination of means on said movable guideway for gripping said length of spring unit to hold the latter during the cutting and forming operation aforesaid, said means including a guide formation on said movable guideway, a movable jaw arranged to reciprocate in said guide formation toward and away from the spring unit, means on said cutting and forming means for releasably holding said movable jaw in raised position and for releasing said movable jaw when the cutting and forming means is operated as aforesaid, coupling means operatively connected to said cutting and forming means and adapted to couple said gripping means with said cutting and forming means when the latter is returned to a normal position, and means frictionally engaging said severed spring unit for withdrawing the same from said movable guideway.

16. In an apparatus of the kind described for making springs, means for coiling wire, means for feeding a continuous wire to said coiling means, said coil, as it is formed, advancing away from said coiling means, means for severing the advanced coil into predetermined lengths, devices for forming attaching connections from proximate portions of the coil, and means for operating said severing means and forming devices in predetermined order to provide springs each with attaching connections at its ends.

17. In an apparatus of the kind described, embodying means for coiling wire, means for feeding a continuous wire to said coiling means, and means for moving the coil away from said coiling means, a support providing a path of movement for the coil away from said moving means, releasable means associated with the support for gripping the wire coil, means for severing the advanced coil into predetermined lengths, devices associated with said severing means for forming loops adjacent said proximate severed ends of the coil, and means for alternately arresting and operating said severing means and loop forming devices.

18. In an apparatus of the kind described, embodying means for coiling wire, means for feeding a continuous wire to said coiling means, and means for moving the coil away from said coiling means, a support providing a path of movement for the coil away from said moving means, separable devices in said support for gripping the wire coil, means for severing the advanced coil into predetermined lengths, means for moving said separable devices to shift the severed length of the wire coil away from the other portion of the coil, devices for forming loops contemporaneously upon the proximate spaced severed ends of the coil, and means for alternately arresting and operating the severing means and the devices for forming the loops.

19. In an apparatus of the kind described including wire coiling means, fixed and movable beds providing a path of movement for a wire coil to be operated upon, a movable carriage adjacent said beds, a blade on said carriage and operable between said beds to shear the coil into a predetermined length, means adapted to shift the movable bed away from the fixed bed to separate the proximate severed ends of the coil, forming devices operable to form loops contemporaneously upon the separated ends of the coil, and means for moving said carriage in predetermined synchronism with the wire coiling means.

20. In an apparatus of the kind described, fixed and movable beds providing a path of movement for a wire coil to be operated upon, a movable carriage adjacent said beds, a blade on said carriage and operable between said beds to shear the coil into predetermined length, means adapted to shift the movable bed away from the fixed bed to separate the proximate severed ends of the coil, forming devices operable to form loops upon the separated ends of the coil, in combination with a wire coiling element positioned and operating to advance the wire coil to and upon said beds, a control for said wire coiling element, and an operative connection respectively between said control and the severing and loop forming devices.

21. In an apparatus of the kind described, fixed and movable beds providing a path of movement for a wire coil to be operated upon, a movable carriage adjacent said beds, a blade on said carriage and operable between said beds to shear the coil into a predetermined length, means adapted to shift the movable bed away from the fixed bed to separate the proximate severed ends of the coil, forming devices operable to form loops upon the separated ends of the coil, in combination with a wire coiling element positioned and operating to advance the wire coil to and upon said beds, driving means for actuating said wire coiling element, a control interposed in said driving means, and an operative connection respectively between said control and the severing and loop forming devices, the said control and said operative connection adapted to arrest operation of said wire coiling element and to operate said severing and loop forming devices.

22. In an apparatus for coiling wire, severing into predetermined lengths, and forming loops at the ends of the severed lengths, means for coiling wire into a helical spring, means for feeding a continuous wire to said coiling means, means for moving the coiled spring away from said coiling means, a fixed bed, a movable bed normally urged towards said fixed bed, said beds providing a path of movement for the coiled spring, a movable carriage above said beds, a severing device on said carriage adapted for movement between said beds to sever a length of coiled spring, means adapted to shift said movable bed away from said fixed bed to separate the severed ends of the coiled spring, means adapted to flex the severed ends of the spring away from their respective body portions, a complementary means for crimping said flexed ends of the spring at a right angle to the respective body portions, and means for moving said carriage with respect to said beds.

23. In an apparatus for coiling wire, severing into predetermined lengths, and forming loops at the ends of the severed lengths, means for coiling wire into a helical spring, means for feeding a continuous wire to said coiling means, means for moving the coiled spring away from said coiling means, a fixed bed, a movable bed normally urged toward said fixed bed, said beds providing a path of movement for the coiled spring, a movable carriage above said beds, a severing device on said carriage adapted for movement between said beds to sever a length of coiled spring, means mounted on and movable with said carriage for shifting said movable bed away from said fixed bed to separate the severed ends of the coiled spring, means on said carriage adapted to flex the severed ends of the spring away from their respective body portions, a complementary means for crimping said flexed ends of the spring at a right angle to the respective body portions, and means for moving said carriage with respect to said beds.

24. In an apparatus for coiling wire, severing into predetermined lengths, and forming loops at the ends of the severed lengths, means for coiling wire into a helical spring, means for feeding a continuous wire to said coiling means, means for moving the coiled spring away from said coiling means, a fixed bed, a movable bed normally urged towards said fixed bed, said beds providing a path of movement for the coiled spring, devices adapted to grip the coiled spring at a predetermined length, a movable carriage above said beds, a severing device on said carriage adapted for movement between said beds to sever a length of coiled spring, means actuated by the movement of said carriage for shifting said movable bed away from said fixed bed to separate the severed ends of the coiled spring, means on said carriage adapted to flex the severed ends of the spring away from their respective body portions, a complementary means for crimping said flexed ends of the spring each at a right angle to its respective body portions, and means for moving said carriage with respect to said beds.

25. In an apparatus for coiling wire, severing into predetermined lengths, and forming loops at the ends of the severed lengths, means for coiling wire into a helical spring, means for feeding a continuous wire to said coiling means, means for moving the coiled spring away from said coiling means, a fixed bed, a movable bed normally urged towards said fixed bed, said beds providing a path of movement for the coiled spring, a movable carriage above said beds, a severing device on said carriage adapted for movement between said beds to sever a length of coiled spring, means on said carriage for shifting said movable bed away from said fixed bed to separate the severed ends of the coiled spring, forming elements mounted on said carriage, said elements adapted to move with said carriage to flex the severed ends of the spring away from their respective body portions and form said flexed ends of the spring into loops, and means for moving said carriage with respect to said beds.

CARL G. HICKS.